(12) United States Patent
Park et al.

(10) Patent No.: US 11,697,399 B2
(45) Date of Patent: Jul. 11, 2023

(54) WASHER FLUID PUMP

(71) Applicants: Hyundai Motor Company, Seoul (KR); Kia Motors Corporation, Seoul (KR)

(72) Inventors: Byoung Gyu Park, Gyeonggi-do (KR); Sang Hyun Jung, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 754 days.

(21) Appl. No.: 16/687,924

(22) Filed: Nov. 19, 2019

(65) Prior Publication Data

US 2020/0324737 A1    Oct. 15, 2020

(30) Foreign Application Priority Data

Apr. 10, 2019    (KR) ........................ 10-2019-0041965

(51) Int. Cl.
| | |
|---|---|
| *F04D 15/00* | (2006.01) |
| *F04D 13/16* | (2006.01) |
| *B60S 1/52* | (2006.01) |
| *F04D 13/02* | (2006.01) |
| *F04D 1/14* | (2006.01) |
| *B60S 1/48* | (2006.01) |
| *B60S 1/50* | (2006.01) |

(52) U.S. Cl.
CPC . *B60S 1/52* (2013.01); *B60S 1/48* (2013.01); *F04D 1/14* (2013.01); *F04D 13/024* (2013.01); *F04D 13/16* (2013.01); *F04D 15/0005* (2013.01); *B60S 1/50* (2013.01)

(58) Field of Classification Search
CPC ...... B60S 1/46; B60S 1/48; B60S 1/50; F04D 13/16; F04D 15/00
See application file for complete search history.

(56) References Cited

U.S. PATENT DOCUMENTS

| | | | |
|---|---|---|---|
| 3,671,144 A * | 6/1972 | Kuck ..................... | B60S 1/583 |
| | | | 417/313 |
| 4,600,363 A * | 7/1986 | Ise ........................ | F04F 5/48 |
| | | | 417/187 |
| 5,257,911 A | 11/1993 | Mota et al. | |
| 6,027,314 A * | 2/2000 | Breslin ................... | F04F 1/08 |
| | | | 417/134 |
| 6,675,989 B1 | 1/2004 | Ritter et al. | |
| 10,794,103 B2 * | 10/2020 | Battlogg ................ | F16F 9/20 |
| 2013/0160871 A1 * | 6/2013 | Mawhinney ........... | F16K 31/18 |
| | | | 73/317 |

(Continued)

FOREIGN PATENT DOCUMENTS

| | | |
|---|---|---|
| DE | 2540698 A1 | 3/1977 |
| KR | 100831100 B1 | 5/2008 |

(Continued)

*Primary Examiner* — Courtney D Heinle
*Assistant Examiner* — Andrew J Marien
(74) *Attorney, Agent, or Firm* — Fox Rothschild LLP (57) ABSTRACT

A washer fluid pump includes: a housing in which a motor and an impeller rotated by the motor are housed; a washer fluid introduction pipe which extends vertically from the housing; a plotter which is movable along the washer fluid introduction pipe; a moving body which is connected to the plotter and contains a magnetic material; and a reed switch which is switched on/off by a movement of the moving body.

15 Claims, 13 Drawing Sheets

(56) References Cited

U.S. PATENT DOCUMENTS

2017/0305392 A1\* 10/2017 Lee ..................... B60S 1/0862
2022/0001841 A1\* 1/2022 Bialetzki ................ F04B 53/14

FOREIGN PATENT DOCUMENTS

| KR | 101517736 B1 | 5/2015 |
| KR | 101603064 B1 | 3/2016 |
| KR | 101691389 B1 | 12/2016 |

\* cited by examiner

WASHER FLUID PUMP

CROSS-REFERENCE TO RELATED APPLICATION

This application claims under 35 U.S.C. § 119(a) the benefit of Korean Patent Application No. 10-2019-0041965, filed on Apr. 10, 2019 in the Korean Intellectual Property Office, the entire contents of which are incorporated by reference herein.

BACKGROUND

(a) Technical Field

The present disclosure relates to a washer fluid pump, more particularly, to the washer fluid pump with an integrated level sensor.

(b) Description of the Related Art

A windshield washer system for a vehicle includes a washer fluid reservoir mounted in an engine compartment, and a washer fluid pump drawing washer fluid from the reservoir and pumping the washer fluid to washer nozzles adjacent to the windshield through a pipe connected to a pump housing under a predetermined pressure.

The washer fluid pump is a motor-driven pump, also referred to as a washer pump and motor. When activated, the washer fluid pump rotates an impeller to pump the washer fluid to the washer nozzles through a passage in the pump housing.

A level sensor is mounted in the washer fluid reservoir to detect a level of washer fluid contained in the washer fluid reservoir. The level sensor detects the level of the washer fluid in the washer fluid reservoir to check if a remaining amount of the washer fluid is insufficient.

A conventional washer fluid pump is mounted at a bottom end of the washer fluid reservoir to use the washer fluid remaining on the bottom of the washer fluid reservoir. In order to prevent the motor of the washer fluid pump from being submerged, the washer fluid reservoir is disposed between a wheel guard and a lamp to locate the motor of the washer fluid pump at a set height (approximately 300 mm) from the ground (or a vehicle floor). As such, the conventional washer fluid pump has a low degree of freedom in design since its mounting position is severely restricted.

In addition, as the conventional washer fluid pump has the motor protruding from the washer fluid reservoir, the motor may be damaged due to collision with other components, and watertightness of the motor is affected. Since the washer fluid in the washer fluid reservoir is likely to flood the motor, there is a high risk that the motor will be damaged due to freezing of washer fluid in winter.

Further, the conventional washer fluid pump needs to have a gap (or gaps) with peripheral components to prevent interference, collision, and the like with the peripheral components (a wheel guard, a lamp, etc.). As a result, the size (or capacity) of the washer fluid reservoir may be relatively reduced, and washer fluid needs to be replenished frequently, making it difficult to meet the customer's needs.

The above information described in this background section is provided to assist in understanding the background of the inventive concept, and may include any technical concept which is not considered as the prior art that is already known to those skilled in the art.

SUMMARY

An aspect of the present disclosure provides a washer fluid pump with an integrated level sensor detecting the level of a washer fluid in a washer fluid reservoir.

According to an aspect of the present disclosure, a washer fluid pump may include: a housing in which a motor and an impeller rotated by the motor are housed; a washer fluid introduction pipe which extends vertically from the housing; a plotter which is movable along the washer fluid introduction pipe; a moving body which is connected to the plotter and contains a magnetic material; and a reed switch which is switched on/off by a movement of the moving body.

The housing may include a hole in which the washer fluid introduction pipe is received, a first cavity in which the moving body is movably received, and a second cavity in which the reed switch is sealingly mounted.

The first cavity and the second cavity may be adjacent to and parallel to each other.

A length of the first cavity may be greater than that of the second cavity.

The washer fluid pump may further include a stopper which is provided on a top end portion of the washer fluid introduction pipe, wherein the stopper may restrict a lower limit position of the moving body.

The stopper may be located below the first cavity.

The moving body may have a plurality of protrusions on a bottom surface thereof, and each protrusion may have a hemispherical shape.

The washer fluid introduction pipe may include an upper pipe, a lower pipe connected to the upper pipe, and a check valve mounted between the upper pipe and the lower pipe.

The check valve may include an upper case coupled to the upper pipe, a lower case coupled to the lower pipe, and a valve which is movable between the upper case and the lower case.

The upper case may include a coupling portion coupled to a bottom end of the upper pipe, and a guide guiding a movement of the valve.

The lower case may include a coupling portion coupled to a bottom end of the lower pipe, and a valve seat on which the valve is seated.

The valve may include a weight body mounted to move along the guide, and a sealing member coupled to a bottom end of the weight body, and the sealing member may be seated on or separated from the valve seat by a movement of the weight body.

The weight body may have a recess in which a washer fluid is contained.

The sealing member may be made of a rubber material containing a magnet, and the lower case may be made of a material containing a ferromagnetic material that adheres to the magnet.

The weight body may have a conical portion on the bottom end thereof, the sealing member may have a shape corresponding to that of the conical portion, and the valve seat may have a tapered surface corresponding to the conical portion of the weight body and the sealing member.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
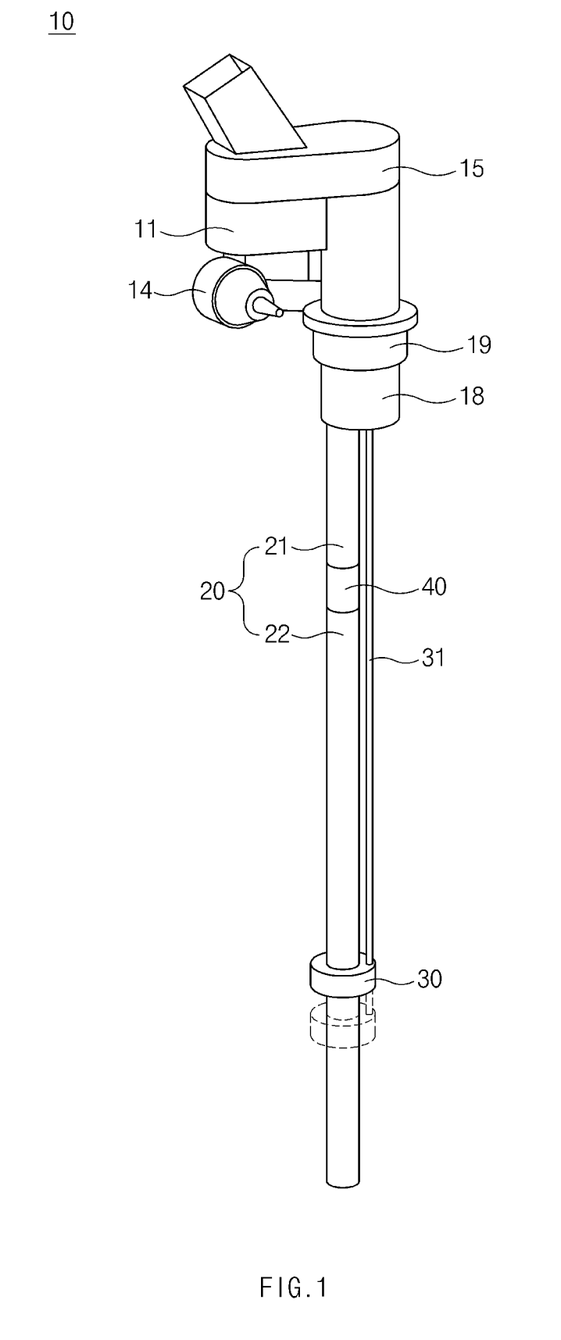
FIG. 1 illustrates a perspective view of a washer fluid pump according to an exemplary embodiment of the present disclosure.
Figure 2:
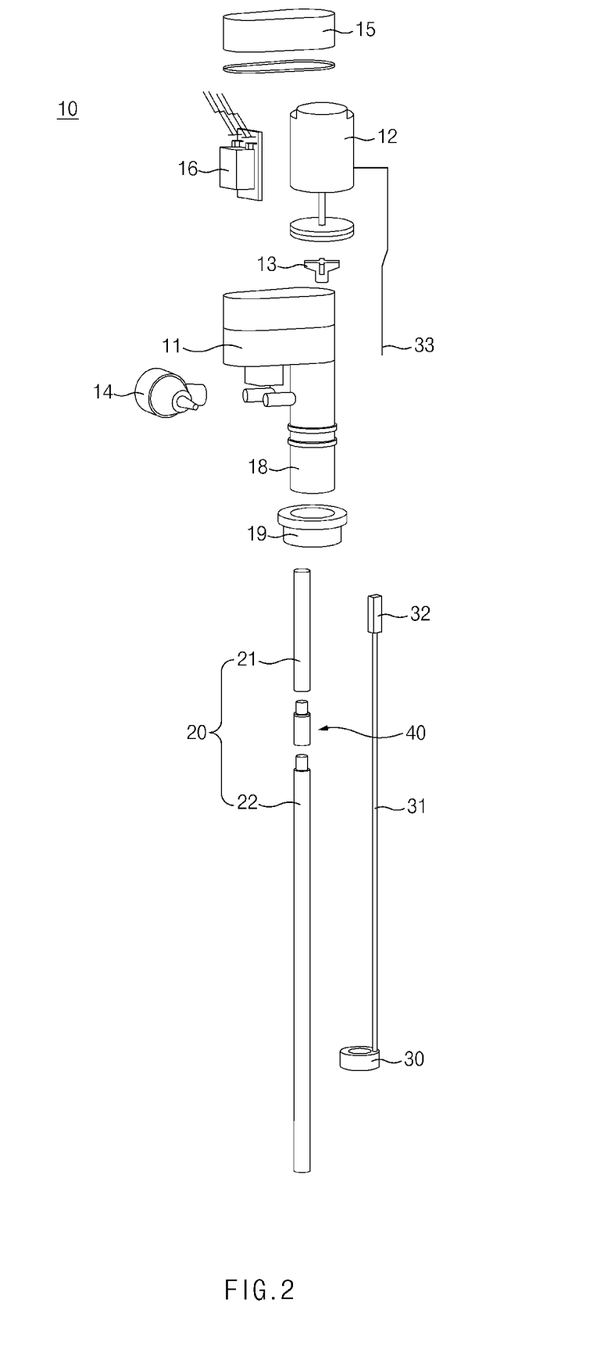
FIG. 2 illustrates an exploded perspective view of a washer fluid pump according to an exemplary embodiment of the present disclosure.
Figure 3:
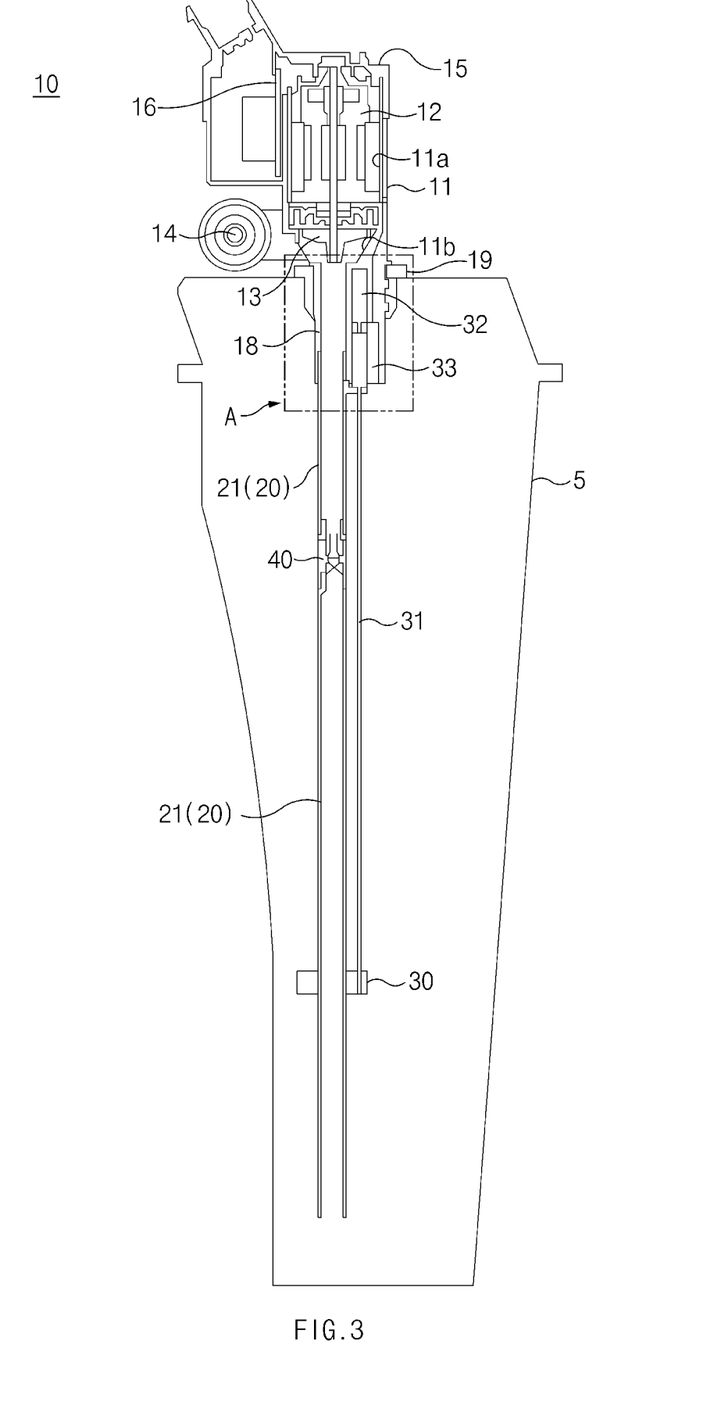
FIG. 3 illustrates a cross-sectional view of a washer fluid pump according to an exemplary embodiment of the present disclosure.

Referring to FIGS. 1 to 3, a washer fluid pump 10 according to an exemplary embodiment of the present disclosure may include a housing 11 in which a motor 12 and an impeller 13 are housed, a washer fluid introduction pipe 20 which extends vertically from the housing 11, a plotter 30 which is movable along the washer fluid introduction pipe 20, a moving body 32 which is integrally connected to the plotter 30, and a reed switch 33 which is switched on/off by movement of the moving body 32.

Referring to FIG. 3, the housing 11 may include a motor chamber 11a containing the motor 12 and a pump chamber 11b containing the impeller 13, and the impeller 13 may be rotated by the motor 12. According to an exemplary embodiment, the motor chamber 11a and the pump chamber 11b may be arranged in a line along a vertical direction. In particular, the motor chamber 11a may be disposed on the pump chamber 11b so that the motor 12 may be located above the impeller 13. The motor chamber 11a may be sealed by the pump chamber 11b, and watertightness of the motor 12 may be improved.

Referring to FIGS. 1 to 3, the housing 11 may have a top opening, and a cover 15 may close the top opening of the housing 11 in a sealing manner.

Referring to FIGS. 2 and 3, a control circuit board 16 controlling the operation of the motor 12 may be mounted in the housing 11. The control circuit board 16 may be housed together with the motor 12 in the motor chamber 11a, or may be housed separately in a chamber partitioned independently of the motor chamber 11a.

Referring to FIGS. 1 to 3, the housing 11 may have the washer fluid introduction pipe 20 and a washer fluid outlet 14, and a washer fluid supply pipe may be connected to the washer fluid outlet 14. As the impeller 13 is rotated by the motor 12, washer fluid may be introduced or drawn from a washer fluid reservoir 5 to the pump chamber 11b through the washer fluid introduction pipe 20, and the washer fluid may be pumped or supplied from the pump chamber 11b to a washer nozzle (not shown) through the washer fluid outlet 14 of the housing 11 and the washer fluid supply pipe.

Referring to FIG. 3, the washer fluid introduction pipe 20 may extend vertically from the bottom of the housing 11 so that the washer fluid introduction pipe 20 may be vertically upright in the washer fluid reservoir 5. A bottom end of the washer fluid introduction pipe 20 may be adjacent to the bottom of the washer fluid reservoir 5. Thus, the washer fluid reservoir 5 may increase its capacity for containing washer fluid, and the washer fluid pump 10 may easily draw the washer fluid staying on the bottom of the washer fluid reservoir 5 so that the washer fluid contained in the washer fluid reservoir 5 may be used efficiently and fully.

Referring to FIGS. 1 to 3, the washer fluid introduction pipe 20 may include an upper pipe 21, a lower pipe 22 connected to the upper pipe 21, and a check valve 40 mounted between the upper pipe 21 and the lower pipe 22. The check valve 40 may include an internal flow path through which the washer fluid flows, and a valve 43 by which the internal flow path is opened and closed. When the motor 12 does not operate, the valve 43 may close the internal flow path, and when the motor 12 operates, the valve 43 may open the internal flow path by negative pressure of the pump chamber 11b.

Referring to FIGS. 10 to 13, the check valve 40 may include an upper case 41 coupled to a bottom end of the upper pipe 21, a lower case 42 coupled to a top end of the lower pipe 22, and the valve 43 which is movable between the upper case 41 and the lower case 42.

Figure 10:
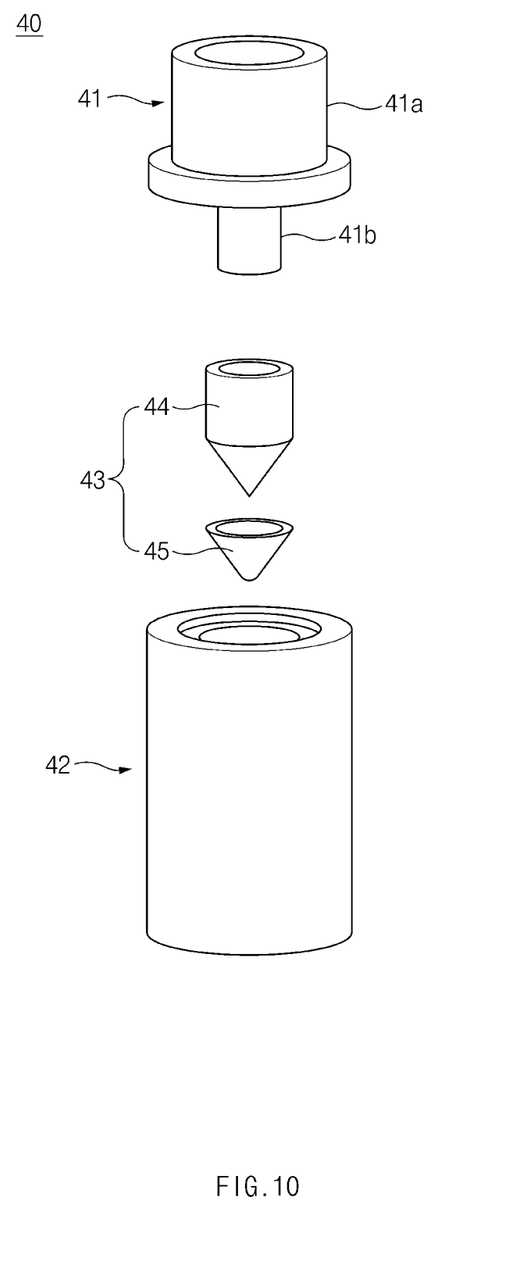
FIG. 10 illustrates an exploded perspective view of a check valve in a washer fluid pump according to an exemplary embodiment of the present disclosure.
Figure 11:
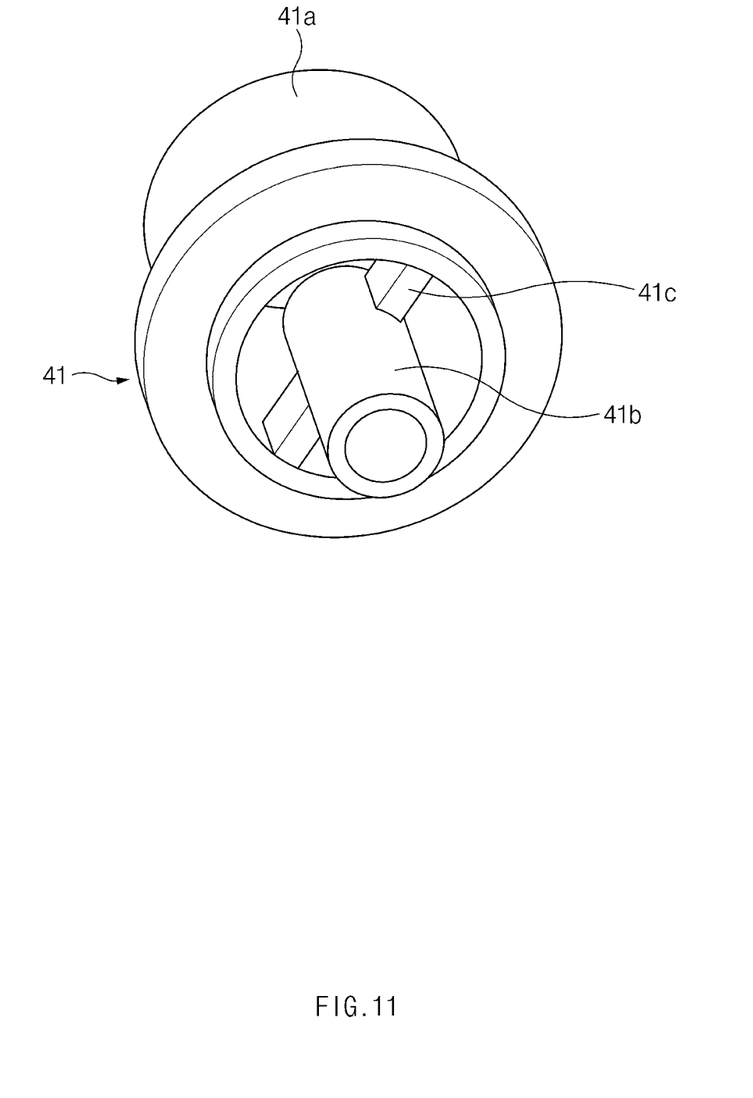
FIG. 11 illustrates a bottom perspective view of an upper case of the check valve of FIG. 10.

The upper case 41 may include a coupling portion 41a coupled to the bottom end of the upper pipe 21, and a guide 41b guiding the movement of the valve 43. The guide 41b may be connected to an inner surface of the upper case 41 through a rib 41c.

The lower case 42 may include a coupling portion 42a coupled to a bottom end of the lower pipe 22, and a valve seat 42b on which the valve 43 is seated.

The upper case 41 may have an internal flow path through which the washer fluid flows, and the lower case 42 may have an internal flow path through which the washer fluid flows. The internal flow path of the upper case 41 and the internal flow path of the lower case 42 may constitute the internal flow path of the check valve 40, and the internal flow path of the check valve 40 may be opened or closed by the valve 43.

The valve 43 may include a weight body 44 mounted to move along the guide 41b, and a sealing member 45 coupled to a bottom end of the weight body 44. When the valve 43 is seated on the valve seat 42b of the lower case 42, the internal flow path of the check valve 40 may be closed, and when the valve 43 is separated from the valve seat 42b of the lower case 42, the internal flow path of the check valve 40 may be opened.

The weight body 44 may have a weight sufficient to maintain seating on the valve seat 42b by its own weight.

The weight body 44 may have a recess 44a on the top thereof, and the washer fluid is contained in the recess 44a. The guide 41b may be inserted into the recess 44a of the weight body 44 so that the weight body 44 may move vertically along the guide 41b. The check valve 40 may be maintained in a closed state by the washer fluid contained in the recess 44a of the weight body 44 and the weight of the weight body 44. Since the washer fluid is contained in the recess 44a of the weight body 44 regardless of the opening and closing of the check valve 40, the washer fluid contained in the recess 44a of the weight body 44 may be immediately delivered to the washer nozzle (not shown) by the impeller 13 when the motor 12 is switched from the non-operating state to the operating state, and thus the injection of the washer fluid by the washer nozzle may be made quickly.

The sealing member 45 may be seated on or separated from the valve seat 42b of the lower case 42 by the movement of the weight body 44. The sealing member 45 may be made of a rubber material containing a magnet, and the lower case 42 may be made of a material containing a ferromagnetic material (e.g., iron) that adheres to the magnet. The sealing member 45 may be tightly seated on the valve seat 42b of the lower case 42 by an attractive force between the magnet of the sealing member 45 and the ferromagnetic material of the lower case 42.

The weight body 44 may have a conical portion 44b on the bottom end thereof, and the sealing member 45 may have a shape corresponding to that of the conical portion 44b. The sealing member 45 may be attached to the conical portion 44b of the weight body 44. The valve seat 42b may have a tapered surface 42c corresponding to the conical portion 44b of the weight body 44 and the sealing member 45.

Figure 12:
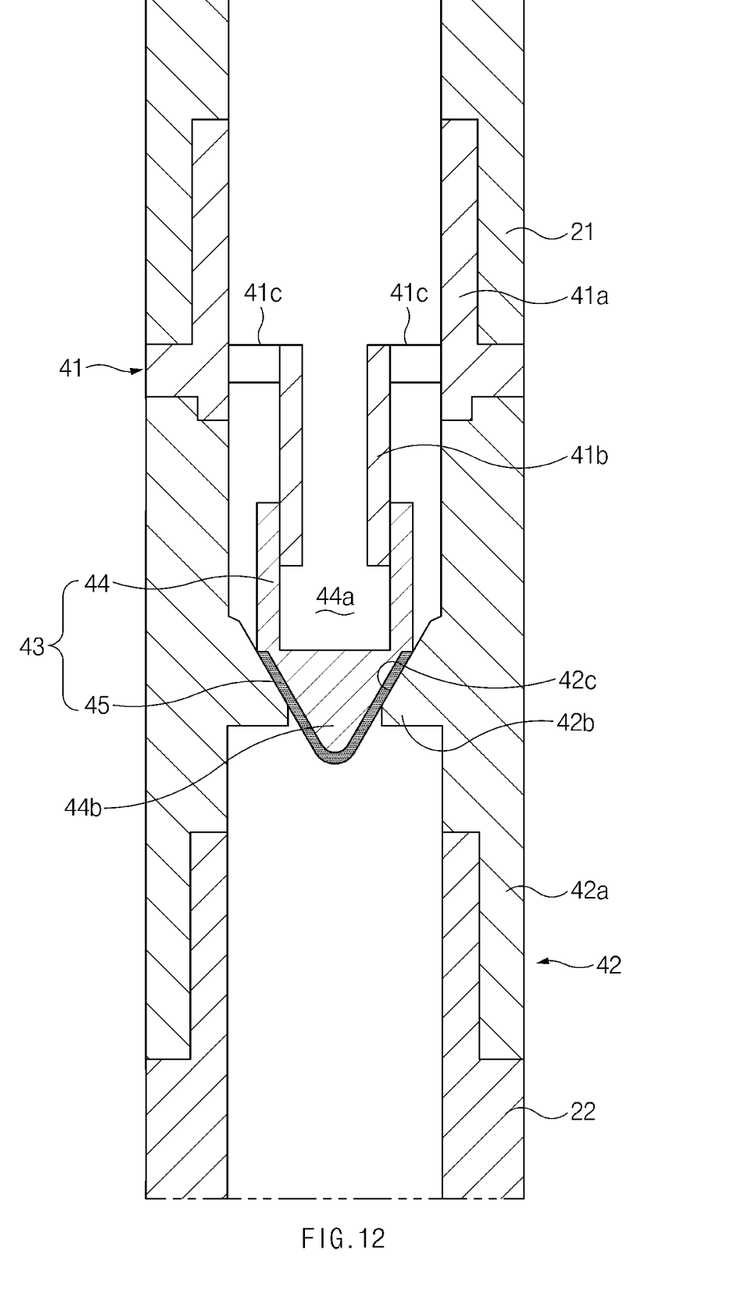
FIG. 12 illustrates a side cross-sectional view of a state in which the check valve of FIG. 10 is closed.

Referring to FIG. 12, when the motor 12 does not operate, the impeller 13 may not be rotated, and no negative pressure may be generated in the pump chamber 11b. Thus, the valve 43 of the check valve 40 may be seated on the valve seat 42b to close the internal flow path of the check valve 40.

Figure 13:
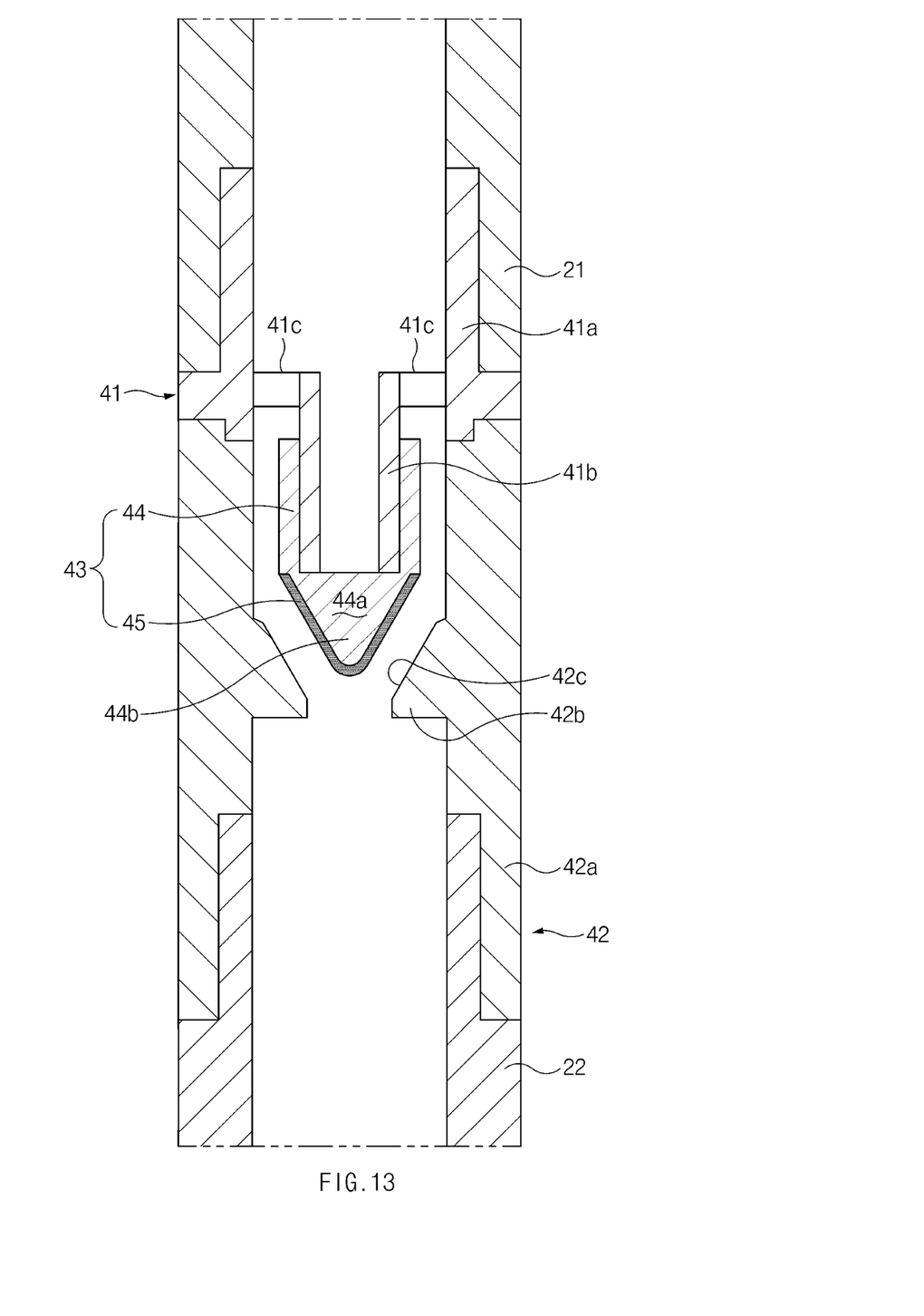
FIG. 13 illustrates a side cross-sectional view of a state in which the check valve of FIG. 10 is opened.

Referring to FIG. 13, when the motor 12 operates, the impeller 13 may be rotated, and negative pressure may be generated in the pump chamber 11b. Thus, the valve 43 may be separated from the valve seat 42b to open the internal flow path of the check valve 40.

According to the exemplary embodiment of the present disclosure, the check valve 40 may be disposed in the washer fluid introduction pipe 20, and the check valve 40 may be closed when the motor does not operate, so that the washer fluid contained in the washer fluid reservoir 5 may be prevented from leaking to the outside, and the check valve 40 may be opened when the motor 12 operates, so that the washer fluid contained in the washer fluid reservoir 5 may be stably pumped to the washer nozzle (not shown). In addition, since the check valve 40 according to the exemplary embodiment of the present disclosure does not employ a spring bias mechanism of a check valve according to the related art, it may lower a discharge pressure of the washer fluid compared to the related art, thereby improving the degree of freedom in design for the pump discharge pressure.

The housing 11 may have an extension portion 18 extending vertically from the bottom of the housing 11, and the extension portion 18 may have a cylindrical shape having a diameter less than a width of the housing 11.

Figure 4:
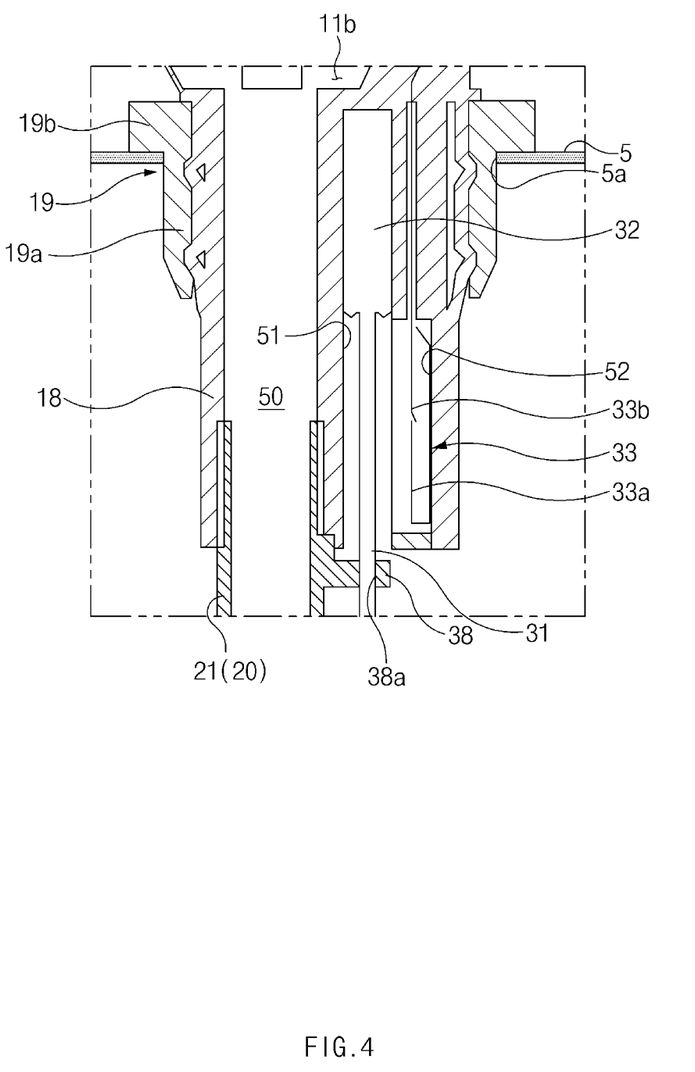
FIG. 4 illustrates an enlarged view of portion A of FIG. 3.
Figure 9:
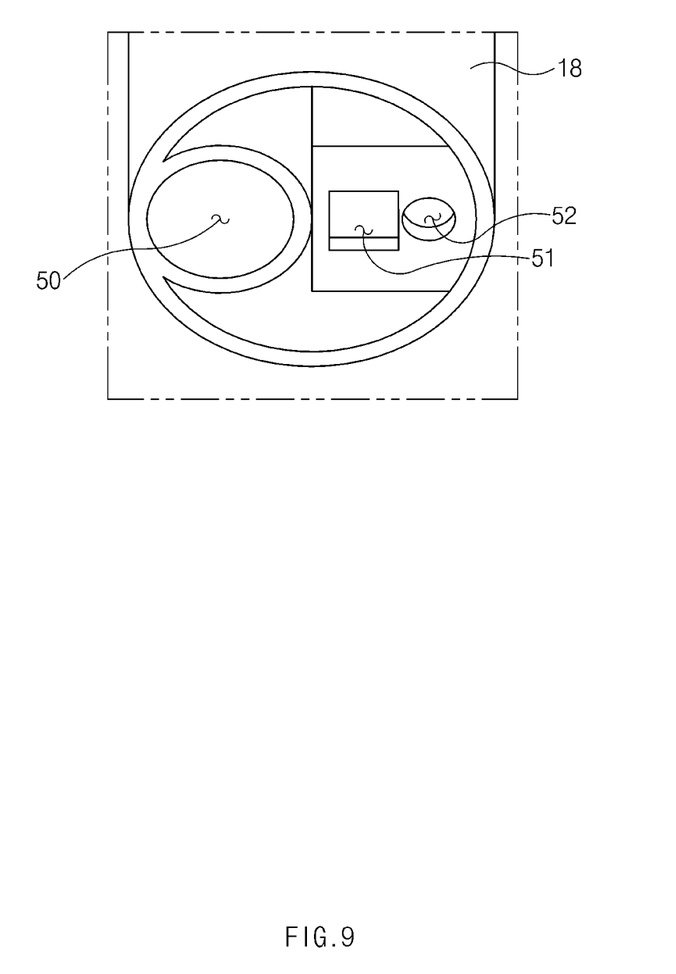
FIG. 9 illustrates a bottom perspective view of an extension portion of a housing in a washer fluid pump according to an exemplary embodiment of the present disclosure.

Referring to FIGS. 4 and 9, the extension portion 18 may include a hole 50 in which a top end of the washer fluid introduction pipe 20 is received, a first cavity 51 in which the moving body 32 is movably received, and a second cavity 52 in which the reed switch 33 is hermetically sealed. The hole 50, the first cavity 51, and the second cavity 52 may be partitioned in a lower portion of the extension portion 18.

The hole 50 may communicate with the pump chamber 11*b* of the housing 11, and the hole 50 may extend vertically to receive the top end of the washer fluid introduction pipe 20. A top end of the upper pipe 21 of the washer fluid introduction pipe 20 may be coupled to the hole 50. For example, a female thread may be formed on an inner surface of the hole 50, and a male thread may be formed on the top end of the upper pipe 21 of the washer fluid introduction pipe 20. Thus, the top end of the upper pipe 21 of the washer fluid introduction pipe 20 may be coupled to the inner surface of the hole 50.

The first cavity 51 may extend in a longitudinal direction of the extension portion 18. That is, the first cavity 51 may vertically extend parallel to the hole 50. As the plotter 30 moves vertically, the moving body 32 may move vertically in the first cavity 51.

The second cavity 52 may extend in the longitudinal direction of the extension portion 18. That is, the second cavity 52 may be adjacent to the first cavity 51, and the second cavity 52 may vertically extend parallel to the first cavity 51. As the reed switch 33 is sealingly mounted in the second cavity 52, the reed switch 33 may detect the movement of the moving body 32 in the first cavity 51.

A length of the first cavity 51 may be greater than that of the second cavity 52, so that the moving body 32 may be configured to be close to a side of the reed switch 33 or be away from the side of the reed switch 33. As the moving body 32 approaches or moves away from the reed switch 33, the on/off operation of the reed switch 33 may be easily performed.

The plotter 30 may have a ring shape surrounding the circumference of the washer fluid introduction pipe 20. The plotter 30 may be mounted to be movable in a longitudinal direction of the washer fluid introduction pipe 20 to detect a level of the washer fluid contained in the washer fluid reservoir 5.

The moving body 32 may be connected to the plotter 30 by a connection rod 31, and the moving body 32 may move together with the plotter 30 in the same direction (the vertical direction). The moving body 32 may be made of a material containing a magnet. The moving body 32 may have a structure in which an outer surface of the magnet is combined with a synthetic resin such as plastic. For example, the moving body 32 may be formed as a unitary one-piece structure by various methods such as insert molding of the magnet and the synthetic resin.

A length of the connection rod 31 may be set such that a movement displacement of the moving body 32 corresponds to that of the plotter 30. The connection rod 31 may be varied according to the size, capacity, and the like of the washer fluid reservoir 5.

The reed switch 33 may be sealed in the second cavity 52, and the reed switch 33 may include a fixed contact 33*a* and a moving contact 33*b*. The moving contact 33*b* may abut or be separated from the fixed contact 33*a* by a magnetic field applied by the magnet of the moving body 32. The reed switch 33 may be turned on as the moving contact 33*b* abuts the fixed contact 33*a,* and the reed switch 33 may be turned off as the moving contact 33*b* is separated from the fixed contact 33*a*.

The reed switch 33 may be electrically connected to the control circuit board 16. The control circuit board 16 may check whether the remaining amount of the washer liquid contained in the washer liquid reservoir 5 is insufficient by the on/off operation of the reed switch 33, thereby waning the lack of the remaining amount of the washer liquid.

Figure 5:
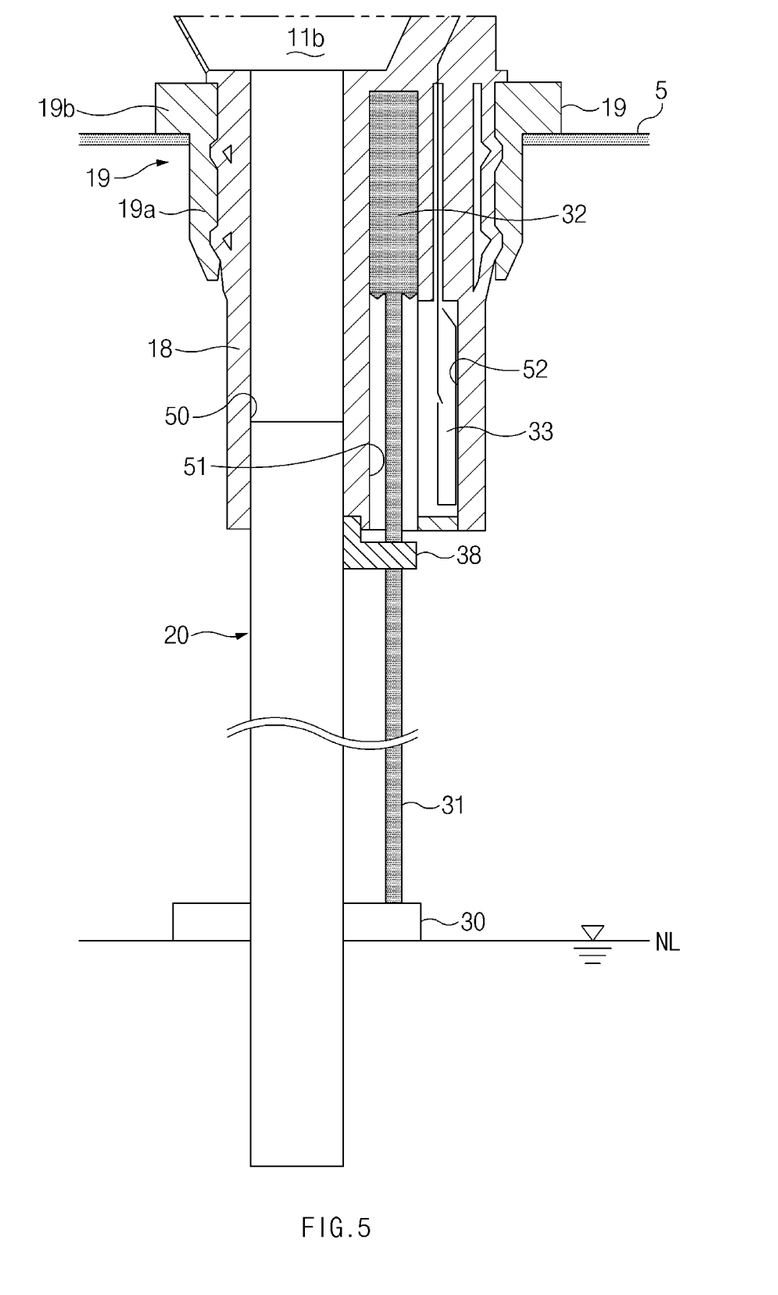
FIG. 5 illustrates a state in which a washer fluid contained in a washer fluid reservoir is sufficient, indicated by a level sensor of a washer fluid pump according to an exemplary embodiment of the present disclosure.

Referring to FIG. 5, when the plotter 30 is positioned in a first predetermined level NL indicating that the washer fluid contained in the washer fluid reservoir 5 is sufficient, the moving body 32 may move upwardly in the first cavity 51 so that the moving body 32 may be away from the reed switch 33, and the reed switch 33 may be turned off.

Figure 6:
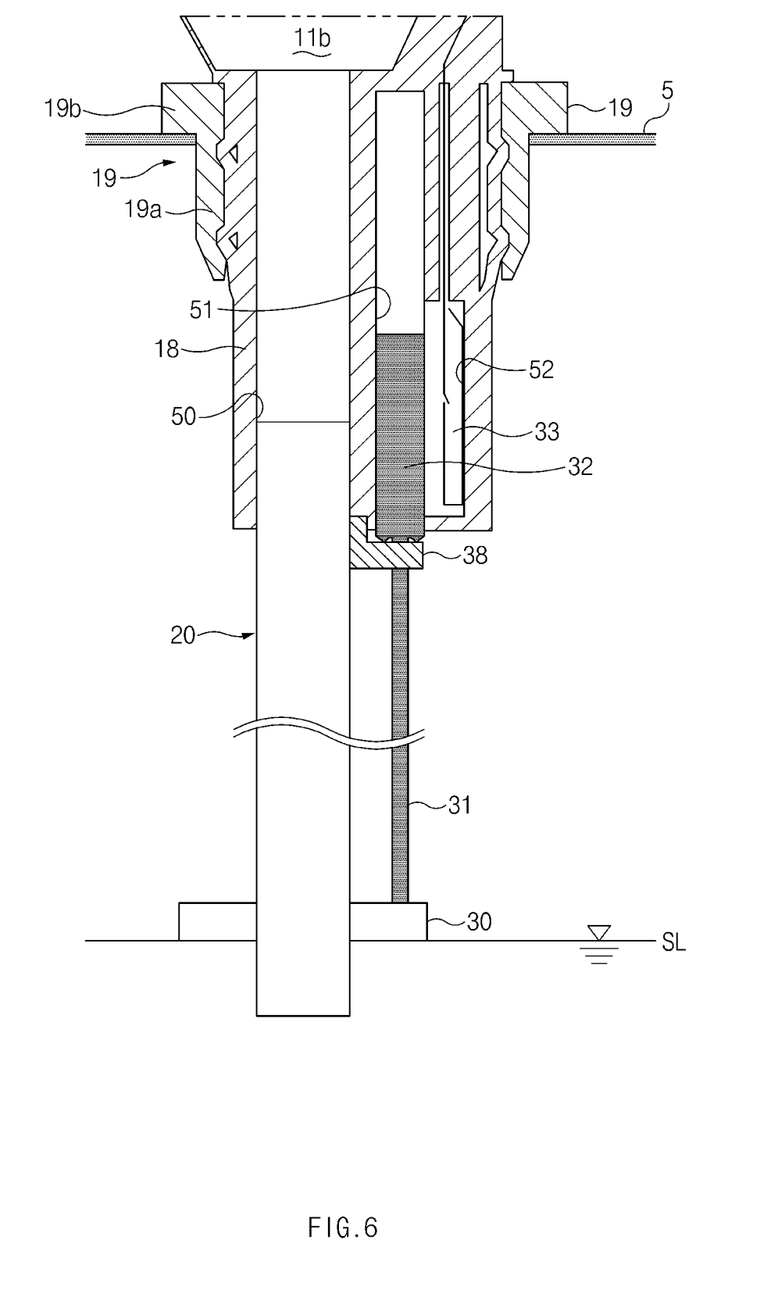
FIG. 6 illustrates a state in which a washer fluid contained in a washer fluid reservoir is insufficient, indicated by a level sensor of a washer fluid pump according to an exemplary embodiment of the present disclosure.

Referring to FIG. 6, when the plotter 30 is positioned in a second predetermined level SL indicating that the washer fluid contained in the washer fluid reservoir 5 is insufficient, the moving body 32 may move downwardly in the first cavity 51 so that the moving body 32 may be close to the reed switch 33 and the reed switch 33 may be turned on. Thus, the reed switch 33 may detect the lack of washer fluid contained in the washer fluid reservoir 5.

Referring to FIGS. 4 to 6, a stopper 38 may be provided on a top end portion of the washer fluid introduction pipe 20, i.e., a top end portion of the upper pipe 21, and the stopper 38 may be located below the first cavity 51. The stopper 38 may be attached to a lateral surface of the washer fluid introduction pipe 20 adjacent to the top end portion of the upper pipe 21 using an adhesive or the like, or may be integrally formed on the lateral surface of the washer fluid introduction pipe 20 adjacent to the top end portion of the upper pipe 21 by casting.

The stopper 38 may have a through hole 38*a* through which the connection rod 31 passes, so that the connection rod 31 may move along the through hole 38*a* of the stopper 38. When the moving body 32 moves downwardly, a bottom surface of the moving body 32 may come into contact with a top surface of the stopper 38 so that a lower limit position of the moving body 32 may be restricted.

Figure 7:
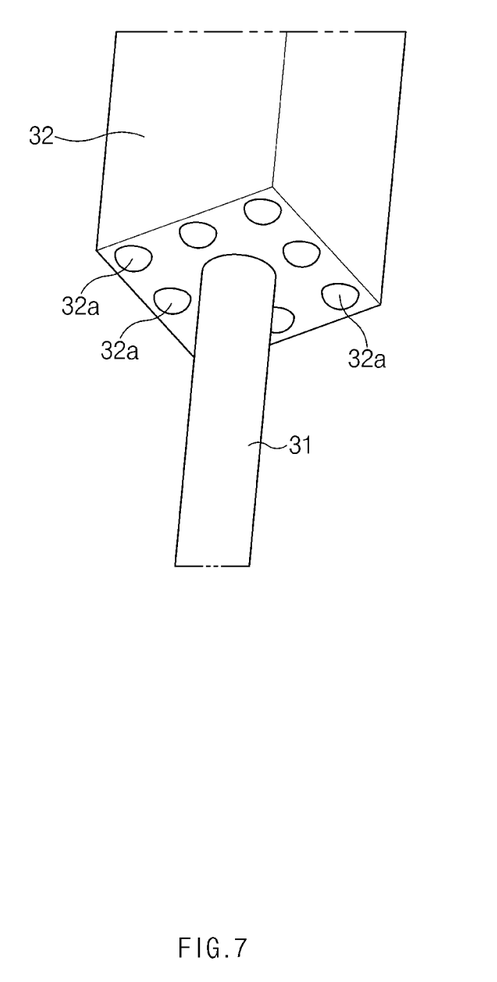
FIG. 7 illustrates a bottom perspective view of a moving body in a washer fluid pump according to an exemplary embodiment of the present disclosure.
Figure 8:
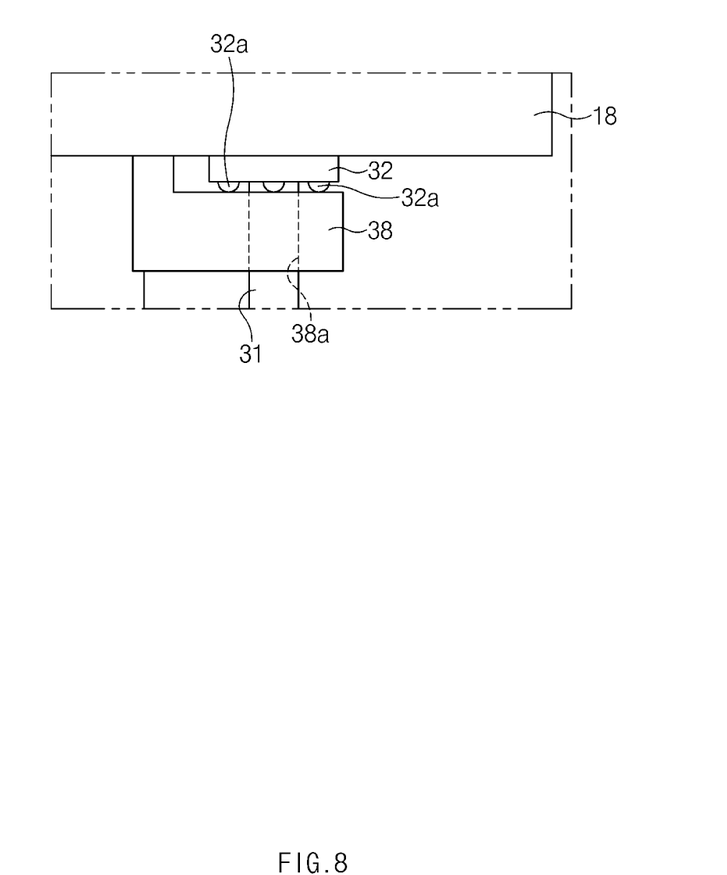
FIG. 8 illustrates a side view of a moving body and a stopper in a washer fluid pump according to an exemplary embodiment of the present disclosure.

Referring to FIGS. 7 and 8, when an area of the bottom surface of the moving body 32 coming into contact with the stopper 38 increases, the bottom surface of the moving body 32 may stick to the top surface of the stopper 38 due to surface tension. In order to overcome this, the moving body 32 according to an exemplary embodiment of the present disclosure may further include a plurality of protrusions 32*a* integrally formed on the bottom surface thereof. The plurality of protrusions 32*a* may have a hemispherical shape. As the protrusions 32*a* of the moving body 32 contact the stopper 38, a contact area between the moving body 32 and the stopper 38 may be reduced, and thus the bottom surface of the moving body 32 may be prevented from sticking to the top surface of the stopper 38 due to the surface tension.

Referring to FIG. 5, the washer fluid pump 10 according to an exemplary embodiment of the present disclosure may further include a support member 19 supporting the housing 11 with respect to the washer fluid reservoir 5. The support member 19 may include a cylindrical portion 19*a* coupled to an outer surface of the extension portion 18, and a flange 19*b* extending from a top end of the cylindrical portion 19*a* in an outer diameter direction. For example, the support member 19 may be a grommet containing an elastic material.

The washer fluid reservoir 5 may have an opening 5*a* in a top end thereof, and the extension portion 18 of the housing 11 of the washer fluid pump 10 may be received in the inside of the washer fluid reservoir 5 through the opening 5*a*. The flange 19*b* of the support member 19 may be seated on an edge of the opening 5*a* of the washer fluid reservoir 5, so that the housing 11 may be stably supported to the top end of the washer fluid reservoir 5.

As set forth above, the plotter 30, the moving body 32, and the reed switch 33 constituting a level sensor detecting the level of washer fluid in the washer fluid reservoir 5 may be mounted on or near the washer fluid introduction pipe 20 of the washer fluid pump 10 so that the washer fluid pump 10 may be mounted on the top of the washer fluid reservoir 5, and the washer fluid staying on the bottom of the washer fluid reservoir 5 may be fully used so that the capacity of the washer fluid reservoir 5 may be increased.

In addition, the washer fluid pump 10 may be easily mounted on the top of the washer fluid reservoir 5 so that the washer fluid pump 10 may ensure sufficient clearance from the ground (or a vehicle floor), and a gap (gaps) between the washer fluid pump 10 and peripheral components (e.g., a wheel guard, a lamp, etc.) may be secured stably. Thus, the probability of damage to the motor 12 due to an impact may be reduced.

Further, as the washer fluid pump 10 is mounted on the top of the washer fluid reservoir 5, the probability of the motor 12 coming into contact with the washer fluid may be reduced so that watertightness of the motor 12 may be improved and the probability of breakage of the motor 12 due to freezing of washer fluid in winter may be lowered.

According to exemplary embodiments of the present disclosure, the level sensor (the plotter, the moving body, and the reed switch) detecting the level of washer fluid in the washer fluid reservoir may be mounted on or near the washer fluid introduction pipe of the washer fluid pump so that the washer fluid pump may be mounted on the top of the washer fluid reservoir. Thus, since the washer fluid staying on the bottom of the washer fluid reservoir is fully used, the amount of washer fluid used in the washer fluid reservoir may be increased.

In addition, according to exemplary embodiments of the present disclosure, as the washer fluid pump is mounted on the top of the washer fluid reservoir, a gap (gaps) between the motor of the washer fluid pump and the peripheral components may be secured stably so that the probability of damage to the motor due to an impact may be reduced.

Further, according to exemplary embodiments of the present disclosure, as the washer fluid pump is mounted on the top of the washer fluid reservoir, the probability of the motor coming into contact with washer fluid may be reduced so that the watertightness of the motor may be improved and the probability of damage to the motor due to freezing of washer fluid in winter may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A washer fluid pump, comprising:
a housing in which a motor and an impeller rotated by the motor are housed;
a washer fluid introduction pipe which extends vertically from the housing;
a plotter which is movable along the washer fluid introduction pipe;
a moving body which is connected to the plotter and contains a magnetic material; and
a reed switch which is switched on/off by a movement of the moving body.

2. The washer fluid pump according to claim 1, wherein the housing includes a hole in which the washer fluid introduction pipe is received, a first cavity in which the moving body is movably received, and a second cavity in which the reed switch is mounted.

3. The washer fluid pump according to claim 2, wherein the first cavity and the second cavity are adjacent to and parallel to each other.

4. The washer fluid pump according to claim 2, wherein a length of the first cavity is greater than that of the second cavity.

5. The washer fluid pump according to claim 2, further comprising a stopper which is provided on a top end portion of the washer fluid introduction pipe, wherein the stopper restricts a lower limit position of the moving body.

6. The washer fluid pump according to claim 5, wherein the stopper is located below a top face of the first cavity.

7. The washer fluid pump according to claim 5, wherein the moving body has a plurality of protrusions on a bottom surface thereof, and each protrusion has a hemispherical shape.

8. The washer fluid pump according to claim 1, wherein the washer fluid introduction pipe includes an upper pipe, a lower pipe connected to the upper pipe, and a check valve mounted between the upper pipe and the lower pipe.

9. The washer fluid pump according to claim 8, wherein the check valve includes an upper case coupled to the upper pipe, a lower case coupled to the lower pipe, and a valve which is movable between the upper case and the lower case.

10. The washer fluid pump according to claim 9, wherein the upper case includes a coupling portion coupled to a bottom end of the upper pipe, and a guide guiding a movement of the valve.

11. The washer fluid pump according to claim 10, wherein the lower case includes a coupling portion coupled to a bottom end of the lower pipe, and a valve seat on which the valve is seated.

12. The washer fluid pump according to claim 11, wherein
the valve includes a weight body mounted to move along the guide, and a sealing member coupled to a bottom end of the weight body, and
the sealing member is seated on or separated from the valve seat by a movement of the weight body.

13. The washer fluid pump according to claim 12, wherein the weight body has a recess in which a washer fluid is contained.

14. The washer fluid pump according to claim 13, wherein
the sealing member is made of a rubber material containing a magnet, and
the lower case is made of a material containing a ferromagnetic material that adheres to the magnet.

15. The washer fluid pump according to claim 14, wherein
the weight body has a conical portion on the bottom end thereof,
the sealing member has a shape corresponding to that of the conical portion, and
the valve seat has a tapered surface corresponding to the conical portion of the weight body and the sealing member.

* * * * *